United States Patent [19]

Kutik et al.

[11] 4,212,332
[45] Jul. 15, 1980

[54] MANUALLY OPERATED PUMP FOR DISPENSING PRODUCT FROM A CONTAINER

[75] Inventors: Louis F. Kutik, Ft. Lauderdale; Howard E. Cecil, Miami, both of Fla.

[73] Assignee: Security Plastics, Inc., Miami Lakes, Fla.

[21] Appl. No.: 879,366

[22] Filed: Feb. 21, 1978

[51] Int. Cl.³ .......................... B67D 5/06; B67D 5/42
[52] U.S. Cl. ..................... 141/98; 222/192; 222/332; 222/383; 239/289; 239/393; 239/394; 417/569
[58] Field of Search ............ 222/154, 156–159, 222/108, 192, 309, 321, 332, 340, 341, 380, 381, 383, 385, 384, 401; 239/289, 333, 350, 392–394, 447; 141/98, 113, 375; 417/549, 569; 251/DIG. 1; 137/625.37

[56] References Cited

U.S. PATENT DOCUMENTS

| 499,538 | 6/1893 | Haswell | 401/195 X |
| 2,722,224 | 11/1955 | Blann | 132/88.5 |
| 2,997,243 | 8/1961 | Kolb | 239/394 X |
| 3,193,149 | 7/1965 | Beaubien | 222/154 X |
| 3,203,454 | 8/1965 | Micallef | 141/113 |
| 3,216,624 | 11/1965 | Corsette | 222/309 X |
| 3,228,567 | 1/1966 | Abplanalp | 222/157 |
| 3,489,322 | 1/1970 | Ayres | 222/384 X |
| 3,532,122 | 10/1970 | Bienzeisler | 137/625.37 |
| 3,680,986 | 8/1972 | Kutik | 222/384 X |
| 3,753,518 | 8/1973 | Kutik | 222/383 |
| 4,051,983 | 10/1977 | Anderson | 222/321 |
| 4,053,086 | 10/1977 | DeBard | 222/341 X |
| 4,079,865 | 3/1978 | Kutik | 222/385 X |

FOREIGN PATENT DOCUMENTS 1207908 10/1970 United Kingdom ................ 222/192

Primary Examiner—Robert J. Spar
Assistant Examiner—Fred A. Silverberg
Attorney, Agent, or Firm—Oltman and Flynn

[57] ABSTRACT

The present pump has a manually operated actuator frictionally coupled to a floating valve to dispense liquid or other fluent product from a container. The floating valve coacts with the actuator and the pump housing to control:

(1) the inlet flow of product from a dip tube in the container up into the pump;
(2) the outlet flow of product from the pump to a discharge spout; and
(3) the connection of an air vent opening to the inside of the container at the top at the proper time in each pumping cycle.

The pump housing has a circular recess on the bottom for a snap fit on a complementary support bead, such as on the top lid of the container itself. A discharge selector valve on the discharge spout enables the selection of either a droplet spray discharge or a continuous flowing stream discharge from the pump. The pump actuator carries an end cap which may be removed for use as a scrub brush. The pump housing has a removable end cap with a depending rib which coacts with the actuator to determine the volumetric capacity of the pump. The pump may be assembled to a measuring cup adapted to be mounted on top of the product container.

18 Claims, 8 Drawing Figures

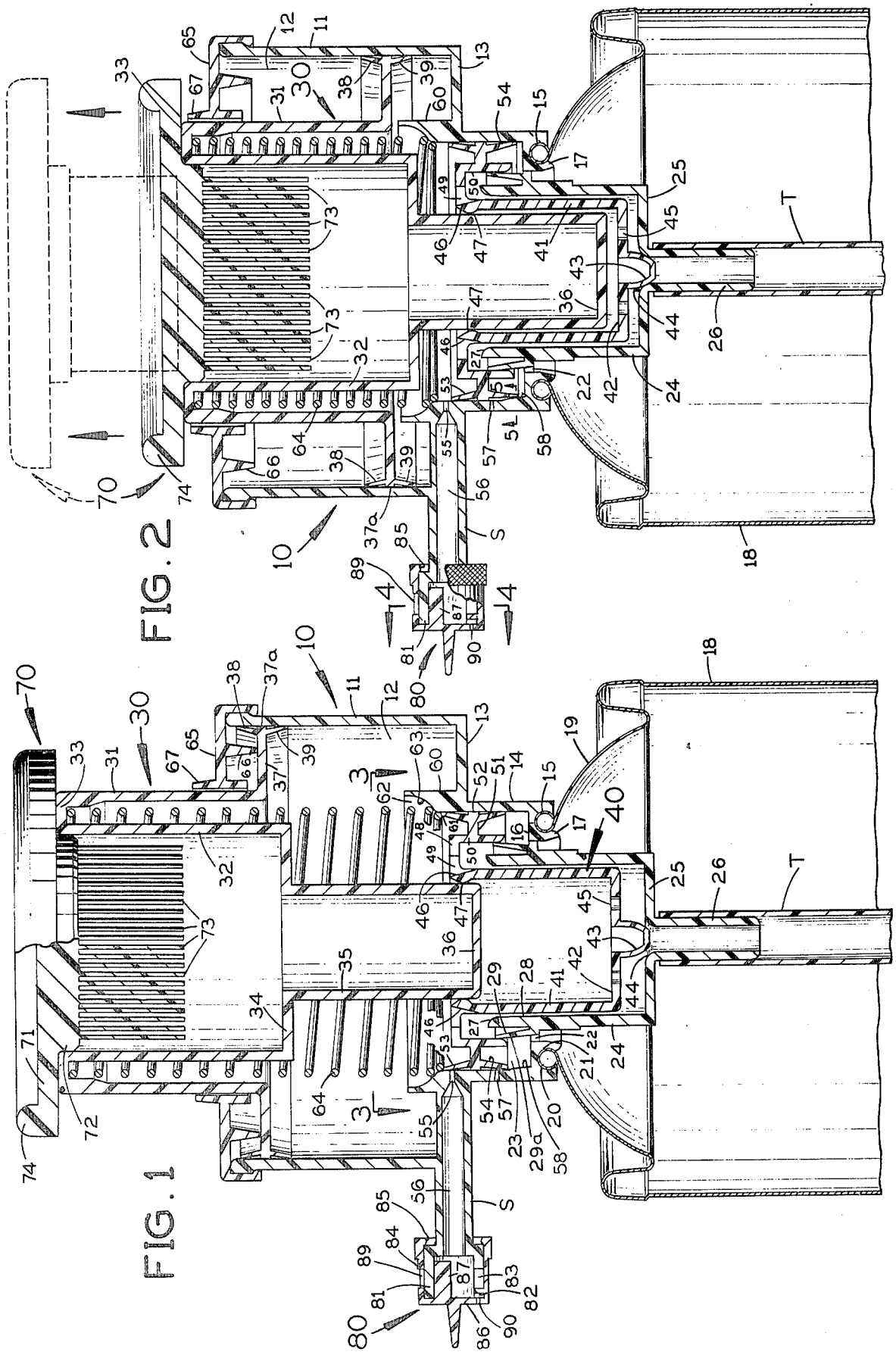

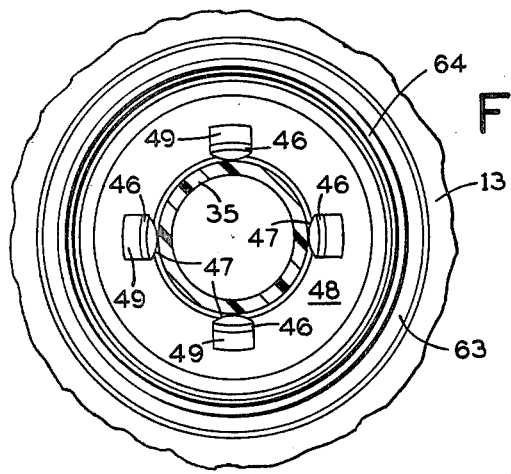
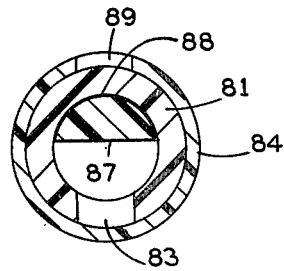
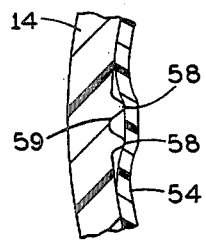
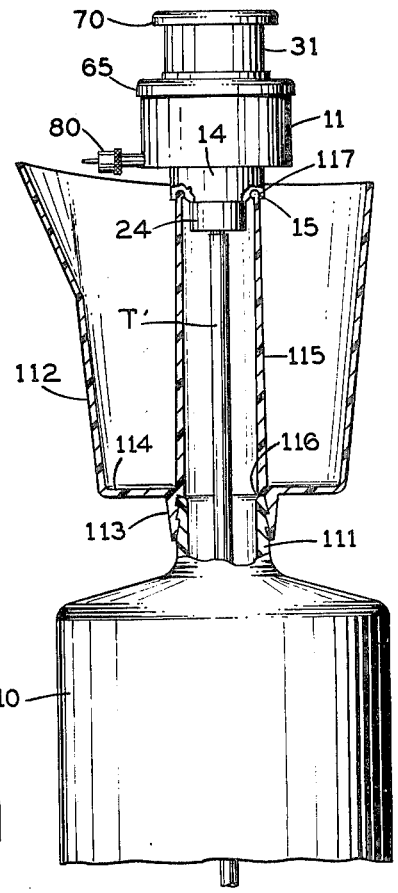
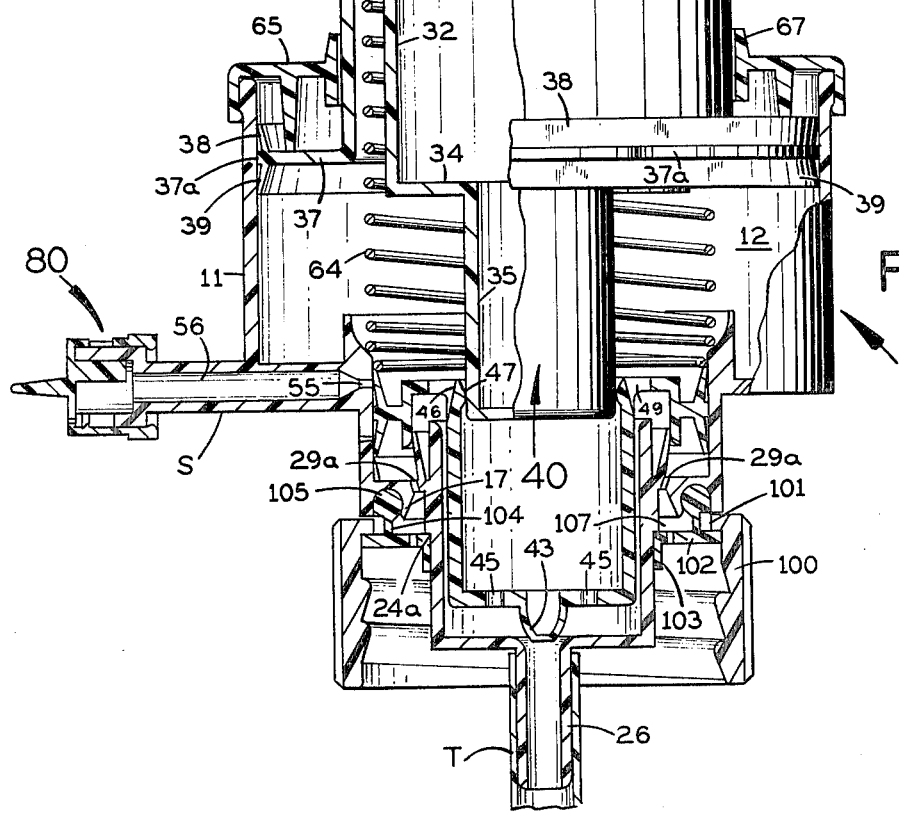
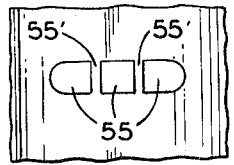

MANUALLY OPERATED PUMP FOR DISPENSING PRODUCT FROM A CONTAINER

BACKGROUND OF THE INVENTION

U.S. Pat. Nos. 3,680,986 and 3,753,518 show product dispensing pumps for dispensing a liquid or other flowable product from a container. Each of these pumps has a floating valve which is frictionally coupled to a manually operated, spring-biased actuator. When the actuator is pushed down it seats the floating valve to block the flow of product up through the usual dip tube, after which the actuator can overtravel downward and force product out of a discharge port in the pump. When the actuator is released and moves back up, it unseats the floating valve and draws product from the container up through the dip tube and then it overtravels upward until stopped. The floating valve cooperates with the product discharge port to block that port when it is unseated and to open that port when it is seated on the aforementioned valve seat.

SUMMARY OF THE INVENTION

The present invention is directed to a novel and improved pump of the general type just mentioned.

In the presently-preferred embodiment, the present pump has a novel floating valve arrangement which coacts with the manually operated actuator to control the withdrawal of product from the container up through the dip tube into the pump, the discharge of the withdrawn product from the pump and the connection of the interior of the container at the top to the atmosphere at the appropriate time in the pumping operation. The floating valve has a novel coaction with the pump housing to maintain the floating valve properly guided in its movement and to control the opening and closing of the product discharge opening and the air vent opening in the pump housing.

One advantageous feature of the presently-preferred embodiment of the invention is an upper end cap on the pump housing which coacts with the actuator to determine the maximum volume of product that is pumped in each complete cycle of operation. Preferably, this end cap is manually removable from the pump housing and is replaceable by a generally similar but structurally modified end cap to change the pump's volumetric capacity per cycle of operation.

Preferably, the pump housing has a circular recess in the bottom which enables it to be attached directly with a snap fit on the beaded top opening of a product container previously in widespread use as an aerosol container, thus enabling containers of this type to be converted to non-aerosol use.

Another advantageous feature of the present invention is a discharge selector valve for the pump which enables the product to be either sprayed in droplets or discharged in a continuous flowing stream.

The upper end of the pump actuator preferably carries a novel end cap which can be detached for use as a scrub brush, when desired.

In one specific embodiment of the invention, the present pump is combined with a measuring cup for attachment to the upper end of the container. In this embodiment, the pump may be operated to discharge the product from the container as a continuous stream down into the measuring cup, and after the desired amount of product has been dispensed it can be poured out of the measuring cup without disturbing the attachment of the measuring cup and the pump to the product container.

The invention is described in detail with reference to the accompanying drawings in which:

FIG. 1 is a vertical section showing the present pump mounted directly on the beaded top lid of a container, with the pump actuator retracted and the floating valve unseated;

FIG. 2 is a similar view showing the actuator depressed and the floating valve seated, and showing in phantom the removal of the end cap from the actuator for use as a scrub brush;

FIG. 3 is a fragmentary cross-section taken along the line 3—3 in FIG. 1 and showing details of the frictional coupling between the actuator and the floating valve;

FIG. 4 is a fragmentary cross-section taken along the line 4—4 in FIG. 2 at the discharge selector valve for the pump;

FIG. 5 is an enlarged fragmentary cross-section taken along the line 5—5 in FIG. 2;

FIG. 6 is a view similar to FIG. 1, but showing a different container mounting arrangement for this pump;

FIG. 7 is a view, partly in side elevation and partly in vertical section, showing the present pump combined with a measuring cup mounted on top of a container; and FIG. 8 is a fragmentary view of an opening with a bridge across it.

Before explaining the disclosed embodiments of the present invention in detail, it is to be understood that the invention is not limited in its application to the details of the particular arrangements shown since the invention is capable of other embodiments. Also, the terminology used herein is for the purpose of description and not of limitation.

FIGS. 1-5

Referring first to FIG. 1, in broad outline the present pump comprises a housing 10 for attachment to the top lid of a container, a reciprocable actuator or plunger 30, a floating valve 40 reciprocable axially inside the housing 10 and operable by the actuator, a top end cap 70 on the actuator, a discharge spout S extending horizontally from the housing 10 at one side, and a discharge selector valve 80 on the outer end of this spout.

The housing 10 presents a cylindrical side wall 11 at its upper end which surrounds a pumping chamber 12 of relatively large diameter. The lower end of the housing side wall 11 is joined to a horizontal, annular, inwardly extending wall 13 whose inner end is joined to a cylindrical, downwardly extending, intermediate side wall 14 of substantially smaller diameter than the upper side wall 11.

In accordance with one feature of the present invention, at the bottom of this intermediate side wall 14 a downwardly-facing, rounded recess 15 is formed by the lower extremity of the side wall 14, a horizontal, inwardly extending, annular wall 16 joined to the inside of the side wall 14 a short distance above its bottom edge, and a flexible and resilient annular lip 17 extending down from the wall 16 radially inward from the side wall 14. The downwardly-facing recess 15 extends circularly around the axis of the housing 10.

In FIG. 1, the product container 18 with which the present pump is used is of a type which has been in widespread use previously as an aerosol container.

However, it is to be understood that such a container would now be filled with liquid or other flowable product without an aerosol propellant because the present pump makes such a propellant unnecessary. The container is closed at the top by the usual domed lid 19 which at the top has the usual rounded, upwardly producting bead 20 extending around a circular central opening 21 in the lid. At its bottom recess 15 the housing 10 has a snap fit on the container lid bead 20, with the downwardly projecting annular lip 17 at the inside of the bottom recess 15 being slightly deformed resiliently, when the housing is applied to the bead 20, to seat the housing tightly in fluid-tight fashion on the container lid. With this arrangement, the present pump is adapted to be applied to containers which have already been mass-produced in great numbers and are of proven reliability.

The transverse housing wall 16 has at least one circumferentially spaced, small, vertical opening 22 immediately inward radially from the depending annular lip 17. This opening communicates with the interior of the container 18 at the latter's upper end and opens up into a generally cylindrical chamber 23 inside the housing which is bounded by the intermediate side wall 14 of the housing.

Radially inward from the opening 22, the transverse wall 16 of the housing is joined at its inner end to a generally cylindrical lower side wall 24 which extends down loosely through the central opening 21 in the container lid 19. The lower end of this side wall 24 is joined to a transverse, annular, bottom wall 25 carrying a downwardly projecting, cylindrical neck 26 which is snugly received in the upper end of the usual dip tube T extending down into the container for withdrawing product from the container near the bottom.

The lower side wall 24 of the housing has a cylindrical extension 27 at its upper end which projects up above the transverse housing wall 16. The side wall 24 and its extension 27 together define a cylindrical chamber 28 in which the floating valve 40 is slidably reciprocable, with a substantial clearance, above the bottom wall 25 of the housing.

The housing also has a flexible and resilient annular lip 29 surrounding the extension 27. The lower end of this lip is joined to the transverse housing wall 16 immediately inward radially from the openings 22 and a very short distance radially outward from the extension 27. The annular outside face 29a of this lip tapers upward and outward at a slight angle from the central axis of the assembly, and the upper end of the lip is resiliently biased radially outward from the extension 27.

The actuator 30 has a cylindrical outside wall 31 and a cylindrical inside wall 32 spaced radially inward from, and coaxial with, the outside wall 31 and connected integrally to it by an annular top wall 33. The lower end of the inside wall 32 is joined to a transverse, inwardly extending, annular wall 34. A smaller diameter cylindrical wall 35 extends down from the inner edge of the transverse wall 34 to a transverse bottom wall 36.

The lower end of the outside wall 31 of the actuator is joined to a transverse, outwardly extending, rigid, annular wall 37. A flexible and resilient, annular upper lip 38 extends upward and outward at a slight angle from the transverse wall 37 into sealing engagement with the inside of the upper side wall 11 of the housing. A flexible and resilient, annular lower lip 39 extends downward and outward at a slight angle from the transverse wall 37 into sealing engagement with this same housing side wall. The transverse wall 37 presents a cylindrical outside edge 37a which engages the housing sidewall 11 between the upper and lower lips 38 and 39. The diameter of the actuator at this outer edge 37a is precisely complementary to the inside diameter of the housing side wall 11 so as to center the actuator 30 slidably in the housing. This snug fit and the rigidity of the transverse wall 37 prevent the lips 38 and 39 from becoming permanently distorted. The upper and lower lips 38 and 39 preferably are flexed slightly inward by their engagement with the inside of the housing side wall 11 so that they provide fluid-tight, slidable seals with this side wall.

The housing 10 presents an annular interior wall 60, which projects up from its transverse wall 13. For part of its extent upward from the transverse wall 13, this interior wall 60 presents a cylindrical inside face 61 which is an extension of the inside face of the intermediate side wall 14 of the housing, thereby providing an extension of the chamber 23 at the latter's upper end. At its upper end the interior wall 60 is cut away at the inside to present an upwardly-facing recess 62 with a rounded bottom face 63.

A coil spring 64 is engaged under compression between the rounded bottom face 63 of the recess 62 in the housing 10 and the annular top wall 33 of the actuator. This spring is spaced from both the outside wall 31 and the inside wall 32 of the actuator where it passes between them. This spring biases the actuator 30 upward along the housing 10.

The housing 10 carries an annular cap 65 which has a snap fit on top of its upper side wall 11. This cap has an integral, downwardly projecting, annular rib 66 which is engageable by the transverse wall 37 of the actuator 30 to provide an upper limit stop for the actuator under the bias exerted by its spring 64. This cap has an annular inside wall 67 which loosely passes the outside wall 31 of the actuator slidably.

In accordance with one feature of the present invention, the actuator 30 has a removable end cap 70 which may be used as a scrub brush when it is detached from the actuator. This end cap has a transverse top wall 71 extending across the top of the actuator and having a reduced diameter, cylindrical extension 72 on the bottom which is snugly received inside the inner side wall 32 of the actuator at its upper end. A plurality of elongated parallel, narrow, flexible and resilient bristles 73 extend down from this extension. The end cap has an upwardly extending, rounded bead 74 at its periphery. Preferably, the entire end cap, including the bristles 73, is molded integrally as a one-piece body of suitable plastic material.

Normally, the end cap 70 is fitted onto the upper end of the actuator 30 as shown in FIG. 1. However, when desired, the end cap may be manually detached from the actuator as shown in phantom in FIG. 2, so that it may be used as a scrub brush. This is particularly advantageous where the present pump is used on a container filled with laundry detergent which may be dispensed, for example, onto heavily soiled collars or cuffs of a garment, after which the end cap 70 may be used as a scrub brush to scrub the detergent into the garment.

Another feature of the present invention is the floating valve 40 and the particular manner in which it coacts with the actuator 30 and the housing 10 to control various valving functions. The floating valve has a generally cylindrical side wall 41 for most of its length. A transverse bottom wall 42 extends across the lower end of the side wall 41. A curved, tapered tip 43 extends down from the middle of the bottom wall 42 for sealing engagement with an upwardly-facing, rounded, valve seat 44 formed at the juncture between the bottom wall 25 and the depending neck 26 on the lower end of the housing 10, as shown in FIG. 2. The valve tip 43 is imperforate so that when it is seated product cannot flow up through the dip tube T past the valve seat 44. The bottom wall 42 of the floating valve 40 is formed with several openings 45 radially outward from the valve tip 43. The valve tip 43 is made of thin, resilient material so that it conforms to the valve seat.

At its upper end the cylindrical side wall 41 of the floating valve has four inwardly bent fingers 46 at 90 degree intervals (FIG. 3), each having a convex tip 47 at the inside which frictionally engages the outside of the lower side wall 35 of the actuator 30. Each of these fingers is biased to engage the actuator tightly but yieldably to permit the actuator 30 to be displaced longitudinally with respect to the floating valve 40 when the latter's tip 43 is firmly seated on the valve seat 44.

The floating valve 40 has an annular top wall 48 extending transversely outward from the upper end of its side wall 41. Openings 49 are formed in this top wall next to the fingers 46 which frictionally engage the actuator 30. The location of these openings immediately behind the fingers 46 enhances their flexibility. A cylindrical skirt 50 extends down from the outer edge of the top wall 48. The inside face of this skirt slidably engages the flexible, resilient, upstanding, annular lip 29 on the housing 10. A rigid annular rib 51 projects transversely outward from the skirt 50 about midway along its height and this rib presents a cylindrical outside face 52 which slidably engages the inside of the intermediate side wall 14 of housing 10. An upwardly and outwardly inclined, flexible and resilient annular lip 53 extends up from the rib 51 into sealing engagement with the inside of the side wall 14 at a location spaced above the slidable engagement of the outer face 52 of rib 51 with this side wall. A downwardly and outwardly inclined, flexible and resilient annular lip 54 extends down from the rib 51 into sealing engagement with the inside of the housing side wall 14 at a location spaced below the engagement of the outer face of the rib therewith. The diameter of the floating valve 40 at its cylindrical edge 52 is precisely complementary to the inside diameter of the intermediate side wall 14 of the housing so as to center the floating valve slidably within the housing 10. This snug fit and the rigidity of the rib 51 prevent the lips 53 and 54 from becoming permanently deformed by their sliding engagement with the inside of the intermediate side wall 14 of the housing. The upper and lower lips 53 and 54 on the floating valve preferably are flexed slightly inward by their engagement with the inside of the housing side wall 14, so that they provide fluid-tight, slidable seals therewith.

At its left side in FIG. 1, the intermediate side wall 14 of the housing is formed with a product outlet port 55 which leads into the longitudinal passageway 56 in the spout S. As shown in FIG. 8, there is a bridge 55' across the opening for preventing scuffing of the lip 53. As shown in FIG. 1, this port 55 is closed by the upstanding lip 53 on the floating valve 40 in the normal position of the parts.

Also at its left side in FIG. 1, the intermediate side wall 14 of the housing is formed with an air vent opening 57 for connecting the housing chamber 23 to the atmosphere. Normally, as shown in FIG. 1, this air vent 57 is closed by the depending lip 54 on the floating valve 40. A short distance below the air vent 57 the housing side wall is formed with inwardly projecting convex ribs 58 which, as shown in FIG. 5, define a narrow air channel 59 between them for connecting the housing chamber 23 to the atmosphere via the air vent 57 when the floating valve 40 is moved down to the position shown in FIG. 2. When this happens the flexible lip 54 on the valve member engages the ribs 58 as shown in FIG. 5, and small air passageways are provided by the channel 59 between these ribs 58 and the spaces formed between the outside face of the lip 54 and the inside of wall 14 at the outside of each rib because of the fact that the lip 54 does not conform perfectly to this side wall at the edges of the ribs 58.

The floating valve 40 preferably is a one-piece, molded body of suitable plastic material which is relatively thin and resiliently deformable at the valve tip 43, so that it will conform tightly to the valve seat 44.

Another feature of this invention is the discharge selector valve 80 on the outer end of the spout S. The spout has a cylindrical enlargment 81 on its outer end. This enlargement has a narrow radial groove 82 in its outer end face and a larger diameter radial opening 83 a short distance to the right of this groove in FIG. 1. This opening 83 is shown in enlarged detail in FIG. 4.

The discharge selector valve 80 has a generally cylindrical side wall 84 which fits slidably and snugly on the outside of the spout enlargement 81. A flexible and resilient, annular, inturned lip 85 at the inner end of this side wall and a transverse outer end wall 86 slidably and snugly engage the opposite ends of the spout enlargement 81. The valve 80 has an internal longitudinal rib 87 which projects from its outer end wall 86 back into the spout enlargement 81. This rib has a cylindrical outside face 88 (FIG. 4) slidably engaging the cylindrical interior of the spout enlargement 81. The side wall 84 of valve 80 is formed with a radial opening 89 which registers with the opening 83 in the spout enlargement when the valve 80 is rotated on the spout enlargement 180 degrees from the position shown in FIGS. 1 and 4. Valve 80 has a small opening 90 in its outer end wall 86 just inside the connection of this end wall to its side wall 84. This opening 90 registers with the groove 82 in the outer end of the spout enlargement 81 when valve 80 is in the rotational position on the spout which is shown in FIG. 1.

OPERATION

Normally, the spring 64 biases the actuator 30 upward along the housing 10, as shown in FIG. 1, against the limit stop defined by the depending rib 66 on the housing cap 65. Due to the frictional engagement of the fingers 46 on the floating valve 40 with the side wall 35 of the actuator 30, the actuator holds the floating valve up as shown in FIG. 1, with its lower end tip 43 unseated from the valve seat 44. The lips 53 and 54 on the floating valve seal the product discharge opening 55 and the air vent 57, respectively.

When the actuator 30 is pushed down against the upward bias exerted by its spring 64, it first carries the floating valve 40 down until the valve tip 43 engages the valve seat 44. The coupling between the actuator and the floating valve at this time is provided by the frictional engagement of the valve fingers 46 against the actuator side wall 35. The floating valve 40 now has reached the position shown in FIG. 2 (although the actuator 30 has not yet reached the FIG. 2 position because it has not begun to overtravel with respect to the floating valve). The product discharge port 55 leading into the spout S is uncovered by the upper lip 53 on the floating valve, and the internal chamber 23 in the housing 10 is connected to the atmosphere through the air vent 57 because of the deflection of the lower lip 54 on the floating valve by the ribs 58 on the housing. Since the housing chamber 23 is connected to the interior of the container 18 through the openings 22, the space inside the container 18 above the product level therein is connected to the atmosphere.

With the valve tip 43 seated against the valve seat to block the flow of product from the dip tube T, continued downward movement of the actuator 30 will cause it to overtravel with respect to the floating valve 40 (which can move no farther downward after it seats on the valve seat 44) to the position shown in FIG. 2. The friction fingers 46 yield enough to permit such overtravel of the actuator.

Assume that this was the first time the pump was used and therefore the upper housing chamber 12 and the lower housing chamber 23 were empty of product from the container.

When the actuator 30 is released, the spring 64 moves it back up against the upper limit stop provided by the housing rib 66. The initial upward movement of the actuator is imparted to the floating valve 40, due to the frictional engagement between them at the valve fingers 46. The floating valve 40 can move up only until its upper lip 53 engages the lower end of the actuator spring 64, after which the actuator 30 overtravels with respect to the floating valve 40, sliding frictionally up between the fingers 46 on the floating valve.

This upward overtravel of the actuator 30 produces a partial vacuum in the upper housing chamber 12, and product is drawn up from the container through the dip tube T past the now-unseated valve tip 43 and into the housing chamber via:

(1) the openings 45 in the bottom wall of the floating valve, and the spaces between the outside of the actuator side wall 35 and the friction fingers 46 on the floating valve 40; and (2) the clearance between the outside of the floating valve 40 and the inside of the lower side wall 24 of the housing, and the openings 49 in the top of the floating valve.

During both the downstroke and the upstroke of the actuator, the lower housing chamber 23 is sealed from the upper housing chamber 12 (which receives product) by the sliding engagement between the housing lip 29 and the depending skirt 50 on the floating valve.

The upstroke of the actuator 30 causes the product discharge port 55 to be closed, and therefore in this stroke no product is discharged into the spout S.

In the next downstroke of the actuator 30, the floating valve 40 first closes the upper end of the dip tube T and opens the product discharge port 55, as described. Continued downward movement (overtravel) of the actuator 30, after the floating valve tip 43 has engaged the valve seat 44, causes product to be forced out of the upper housing chamber 12 and through the product outlet port 55 into the spout passageway 56. Product is discharged through the valve 80, either in a spray of fine droplets, when the valve opening 90 registers with the groove 82 in the spout enlargement 81, or in a continuous, downwardly directed stream, when the valve opening 89 registers with the spout opening 83.

In the downward overtravel of the actuator 30 with respect to the floating valve 40, the reduced lower end 35, 36 of the actuator moves down into the floating valve and displaces product up between them into the space above the floating valve. Also, in this overtravel some of the product is forced down through the openings 45 in the floating valve 40 and up through the clearance between the floating valve and the housing 10 (inside the latter's lower side wall 24) and into the pumping chamber 12.

When the actuator is released, the spring 64 moves it back up, reopening the floating valve 40 and drawing product again up through the dip tube T into the upper housing chamber 12 and the space inside the floating valve below the bottom wall 36 of the actuator.

FIG. 6

FIG. 6 shows the valve of FIGS. 1–5 with a modified mounting arrangement for attaching it to a container (not shown) which has an externally screw-threaded neck.

As shown in FIG. 6, this modified mounting arrangement comprises an internally screw-threaded ring or collar 100 having an inturned, annular lip 101 at its upper end. A flat, annular sealing ring 102 extends between the bottom of this lip and a downwardly-facing, annular shoulder 24a on the outside of the housing side wall 24. This sealing ring has a depending, annular flange 103 at the inside which engages the outside of the housing side wall 24 directly below the shoulder 24a.

The sealing ring carries an upstanding annular rib 104 with an enlarged bead 105 of circular cross-section on its upper end. The bottom recess 15 in the housing 10 has a snap fit on this bead.

The sealing ring 102 has openings 106 at the inside of the beaded rib 104 which communicate with an annular space 107 bounded by the beaded rib 104 at the outside, the transverse housing wall 16 and its depending annular lip 17 at the top, the housing wall 24 at the inside, and the sealing ring 102 at the bottom. The openings 29a in the housing wall 16 connect this space 107 to the small chamber 23 in the housing above, which is connected to the atmosphere during the operation of the pump as already described in detail.

When the mounting ring 100 is screwed onto the container neck, the sealing ring 102 sealingly engages the top of the container neck to provide a fluid-tight seal for the present pump on this container.

In other respects, the construction and operation of the pump are as already described in detail.

FIG. 7

FIG. 7 shows another modified mounting arrangement which includes a measuring cup positioned to receive product when the pump is operated with its discharge selector valve 80 positioned to pass the product downward in a continuous stream through its opening 87.

As shown in FIG. 7, the container 110 has an externally screw-threaded neck 111 at the top. The mounting arrangement for the pump includes a measuring cup 112 having an internally screw-threaded boss or collar 113 extending down from the middle of its bottom wall 114 and threaded onto the container neck 111. The measuring cup has a support for the pump in the form of an upstanding, central tube 115 extending up from its bottom wall around a central opening 116 in the latter at the upper end of the collar 113. This support tube carries an enlarged bead 117 of circular cross-section on its upper end on which the bottom recess 15 in the pump housing has a snap fit.

The dip tube T' is long enough to project from near the bottom of the container up through the tube 115 to its connection to the lower end of the pump housing, as already described.

The pump is constructed and operates as already described in detail with reference to FIGS. 1–5. The valve 80 on its discharge spout is turned to the position in which the openings 89 and 83 register with one another to direct a continuous stream of product (as distinguished from a fine spray of droplets) down into the measuring cup 112 when the pump is operated.

The measuring cup preferably is calibrated so that the user can tell how much product has been pumped into the cup. This arrangement is particularly advantageous when the product is a liquid laundry detergent.

The measuring cup could snap onto the container if desired.

In each of the foregoing embodiments of the invention, the volumetric capacity of the pump can be changed simply by replacing the housing end cap 65 with a similar end cap having a shorter or longer depending rib 66. The vertical length of this rib determines the extent to which the actuator 30 is retracted upward by the spring 64, and thus the pump volume.

I claim:

1. In a pump for dispensing product from a container through a dip tube extending up through the container, said pump having:
    a housing attachable to the container at the top and to the upper end of the dip tube, said housing presenting an upwardly facing valve seat communicating with the upper end of the dip tube;
    a floating valve in the housing above said valve seat having an imperforate valve element at its lower end sealingly engageable with said valve seat to completely block the upward flow of product at said valve seat, said floating valve being reciprocable toward and away from said valve seat;
    an actuator reciprocable in the housing above said floating valve to withdraw product from the container and pump the withdrawn product from the housing;
    and means providing a frictional coupling between said actuator and said floating valve to impart the actuator movement to the floating valve and to permit overtravel of the actuator with respect to the floating valve when the latter is restrained against movement with the actuator;
    said floating valve having a recess therein above its lower end which is open at its upper end;
    said housing and said reciprocable actuator together providing a variable volume pumping chamber above the floating valve;
    said actuator extending down into said recess in the floating valve with a first clearance between them;
    the improvement wherein said floating valve has openings in its lower end laterally outward from said imperforate valve element and said valve seat which lead up into said recess for passing product from the dip tube up into said recess when the actuator is moved up to unseat said valve element on the floating valve from the valve seat;
    said actuator, in its downstroke overtravel after seating said valve element on the valve seat, being operative to move down within said recess and thereby force product out of said recess up into said pumping chamber through said clearance between the actuator and the floating valve at said recess;
    said housing reciprocably receiving said floating valve with a second clearance between them extending from the lower end of the floating valve up into said pumping chamber;
    and said actuator, in its downstroke overtravel after seating said valve element on the valve seat, forcing product out of said recess down through said openings in the lower end of the floating valve and up through said second clearance between the floating valve and the housing into said pumping chamber.

2. A pump according to claim 1, wherein said means frictionally coupling the actuator to the floating valve comprises protrusions on one yieldably engaging the other at circumferentially spaced locations in said recess.

3. A pump according to claim 1, wherein said floating valve has:
    a circumferential outer edge slidably engaging the inside of said housing radially outward from said recess;
    and an upwardly and outwardly inclined, flexible and resilient upper lip slidably and sealingly engaging the inside of said housing in spaced relationship above said circumferential outer edge;
    and further comprising:
    a discharge spout extending transversely outward from said housing;
    and means providing a product discharge opening in said housing leading from said pumping chamber into said spout for passing product from said pumping chamber into the spout;
    said upper lip blocking said product discharge opening when said valve element on the lower end of the floating valve is unseated from said valve seat and uncovering said product discharge opening for passing product from said pumping chamber into the spout when said valve element is seated on said valve seat.

4. In a pump for dispensing product from a container through a dip tube extending up through the container, said pump having:
    a housing attachable to the container at the top and to the upper end of the dip tube, said housing presenting an upwardly facing valve seat communicating with the upper end of the dip tube;
    a floating valve in the housing above said valve seat having an imperforate valve element at its lower end sealingly engageable with said valve seat to completely block the upward flow of product at said valve seat, said floating valve being reciprocable toward and away from said valve seat;
    an actuator reciprocable in the housing above said floating valve to withdraw product from the container and pump the withdrawn product from the housing;
    and means providing a frictional coupling between said actuator and said floating valve to impart the actuator movement to the floating valve and to permit overtravel of the actuator with respect to the floating valve when the latter is restrained against movement with the actuator;
    said floating valve having a recess therein above its lower end which is open at its upper end;

said housing and said reciprocable actuator together providing a variable volume pumping chamber above the floating valve;

said actuator extending down into said recess in the floating valve with a clearance between them;

the improvement wherein said floating valve has openings in its lower end laterally outward from said imperforate valve element and said valve seat which lead up into said recess for passing product from the dip tube up into said recess when the actuator is moved up to unseat said valve element on the floating valve from the valve seat; said housing having:

an outer side wall spaced laterally outward from said recess in the floating valve and having an air vent opening therein;

an internal chamber below said air vent opening leading down into the upper end of the container;

and downwardly extending rib means on the inside of said outer side wall below said air vent opening;

and said floating valve having:

a circumferential outer edge slidably engaging the inside of said outer side wall of the housing above said air vent opening;

and a downwardly and outwardly inclined, flexible and resilient, lower lip slidably and sealingly engaging the inside of said side wall of the housing in spaced relationship below said outer edge;

said lower lip blocking said air vent opening when said valve element on the lower end of the floating valve is unseated from the valve seat and engaging said rib means to connect said air vent opening to said internal chamber when said valve element is seated on said valve seat.

5. In a pump for dispensing product from a container through a dip tube extending up through the container, said pump having:

a housing attachable to the container at the top and to the upper end of the dip tube, said housing presenting an upwardly facing valve seat communicating with the upper end of the dip tube;

a floating valve in the housing above said valve seat having an imperforate valve element at its lower end sealingly engageable with said valve seat to completely block the upward flow of product at said valve seat, said floating valve being reciprocable toward and away from said valve seat;

an actuator reciprocable in the housing above said floating valve to withdraw product from the container and pump the withdrawn product from the housing;

and means providing a frictional coupling between said actuator and said floating valve to impart the actuator movement to the floating valve and to permit overtravel of the actuator with respect to the floating valve when the latter is restrained against movement with the actuator;

said floating valve having a recess therein above its lower end which is open at its upper end;

said housing and said reciprocable actuator together providing a variable volume pumping chamber above the floating valve;

said actuator extending down into said recess in the floating valve with a first clearance between them;

the improvement wherein said floating valve has openings in its lower end laterally outward from said imperforate valve element and said valve seat which lead up into said recess for passing product from the dip tube up into said recess when the actuator is moved up to unseat said valve element on the floating valve from the valve seat; said housing having:

an outer side wall spaced radially outward from said recess in the floating valve and having an air vent opening therein;

an internal chamber below said air vent opening leading down into the upper end of the container;

and downwardly extending rib means on the inside of said outer side wall below said air vent opening;

and said floating valve having:

a cylindrical outer edge located radially outward from said recess in the floating valve and slidably engaging the inside of said outer side wall of the housing above said air vent opening;

an upwardly and outwardly inclined, flexible and resilient, annular, upper lip slidably and sealingly engaging the inside of said housing in spaced relationship above said circumferential outer edge;

and a downwardly and outwardly inclined, flexible and resilient, annular, lower lip slidably and sealingly engaging the inside of said side wall of the housing in spaced relationship below said outer edge;

said lower lip blocking said air vent opening when said valve element on the lower end of the floating valve is unseated from the valve seat and engaging said rib means to connect said air vent opening to said internal chamber when said valve element is seated on said valve seat;

and further comprising:

a discharge spout extending transversely outward from said housing;

and means providing a product discharge opening in said housing leading from said pumping chamber into said spout for passing product from said pumping chamber into the spout;

said upper lip blocking said product discharge opening when said valve element on the lower end of the floating valve is unseated from said valve seat and uncovering said product discharge opening for passing product from said pumping chamber into the spout when said valve element is seated on said valve seat.

6. A pump according to claim 5 wherein:

said means frictionally coupling the actuator to the floating valve comprises protrusions on one yieldably engaging the other at circumferentially spaced locations in said recess;

said actuator, in its downstroke overtravel after seating said valve element on the valve seat, is operative to move down within said recess and thereby force product out of said recess up into said pumping chamber through said first clearance between the actuator and the floating valve at said recess;

said housing reciprocably receives said floating valve with a second clearance between them extending from the lower end of the floating valve up into said pumping chamber;

and said actuator, in its downstroke overtravel after seating said valve element on the valve seat, forces product out of said recess down through said openings in the lower end of the floating valve and up through said last-mentioned clearance into said pumping chamber.

7. A pump for dispensing product from a container through a dip tube extending up through the container, said pump having:

a housing attachable to the container at the top and to the upper end of the dip tube, said housing presenting an upwardly-facing valve seat communicating with the upper end of the dip tube;

a floating valve in the housing above said valve seat having a valve element at its lower end sealingly engageable with said valve seat, said floating valve being reciprocable toward and and away from said valve seat;

an actuator reciprocable in the housing above said floating valve to withdraw product from the container and pump the withdrawn product from the housing;

means providing a frictional coupling between said actuator and said floating valve to impart the actuator movement to the floating valve and to permit overtravel of the actuator with respect to the floating valve when the latter is restrained against movement with the actuator;

said housing and said reciprocable actuator together providing a variable volume pumping chamber above the floating valve;

said housing having an outer side wall with a product discharge opening therein leading from said pumping chamber; a discharge spout extending from said product discharge opening laterally of the housing;

an air vent opening in said outer side wall below said product discharge opening;

an internal chamber below said air vent opening leading into the upper end of the container;

a circumferential outer edge on said floating valve slidably engaging the inside of said outer side wall of the housing to guide the floating valve therein;

an upper lip on said floating valve closing said product discharge opening when said valve element on the lower end of the floating valve is unseated from said valve seat and uncovering said product discharge opening when said valve element is seated on said valve seat;

a lower lip on the floating valve closing said air vent opening when said valve element on the lower end of the floating valve is unseated from said valve seat and uncovering said air vent opening when said valve element is seated on said valve seat;

and means for providing an air passageway between said lower lip and the inside of said outer side wall of the housing to connect said air vent opening to said internal chamber when said valve element is seated on said valve seat.

8. A pump according to claim 7, wherein:

said outer side wall of the housing is cylindrical on the inside;

said circumferential outer edge on the floating valve is cylindrical and substantially complementary to the cylindrical inside of said outer wall;

said upper lip is an annular, flexible and resilient lip which is inclined upwardly and outwardly for sealing engagement circumferentially with the inside of said outer wall above the engagement of said cylindrical outer edge on the floating valve therewith;

and said lower lip is an annular, flexible and resilient lip which is inclined downwardly and outwardly for sealing engagement circumferentially with the inside of said outer wall below the engagement of said cylindrical outer edge on the floating valve therewith.

9. In a pump for dispensing product from a container through a dip tube extending up through the container, said pump having:

a housing attachable to the container at the top and to the upper end of the dip tube, said housing presenting an upwardly-facing valve seat communicating with the upper end of the dip tube;

a floating valve in the housing above said valve seat having a valve element at its lower end sealingly engageable with said valve seat, said floating valve being reciprocable toward and away from said valve seat;

an actuator reciprocable in the housing above said floating valve to withdraw product from the container and pump the withdrawn product from the housing;

and means providing a frictional coupling between said actuator and said floating valve to impart the actuator movement to the floating valve and to permit overtravel of the actuator with respect to the floating valve when the latter is restrained against movement with the actuator;

said housing and said reciprocable actuator together providing a variable volume pumping chamber above the floating valve;

the improvement wherein said floating valve has:

an annular top wall extending transversely outward;

an annular skirt extending down from said annular top wall;

and an annular rib extending transversely outward from said skirt and terminating in a cylindrical outer edge;

and said housing has:

an annular wall extending around said floating valve below the latter's annular top wall;

an annular upwardly and outwardly inclined lip extending around said annular housing wall and slidably engaging said annular skirt below said annular top wall of the floating valve;

and an annular outer wall with a cylindrical inside surface slidably engaged by said cylindrical outer edge of said annular rib on the floating valve.

10. A pump according to claim 9, wherein:

said housing between its annular wall extending around said floating valve below the latter's annular top wall and said outer wall provides a chamber below said skirt and rib on the floating valve;

said housing has an opening at the bottom of said chamber below said skirt and rib on the floating valve leading down into the upper end of the container when said housing is attached to the container;

said housing has an air vent opening in said outer side wall leading into said chamber below said skirt and rib on the floating valve:

said floating valve has a lower lip projecting from said annular rib and sealingly engaging the inside of said outer wall of the housing below said cylindrical outer edge of said rib, said lower lip blocking said air vent opening from said chamber below said skirt and rib on the floating valve when the floating valve is unseated from the valve seat by said actuator;

and means for disengaging said lower lip on the floating valve from sealing engagement with the inside of said outer wall of the housing, whereby to connect said air vent opening to said chamber below said skirt and rib on the floating valve, when the floating valve is seated on the valve seat by said actuator.

11. A pump according to the claim 10, wherein said disengaging means comprises rib means projecting inward from said outer side wall at the inside and slidably engageable by said lower lip on the floating valve to break its sealing engagement with the inside of said outer wall when the latter is seated by said actuator.

12. A pump according to claim 11, wherein:

said outer wall of the housing has a product discharge opening therein leading from said pumping chamber;

and said floating valve has an upper lip projecting from said annular rib and sealingly engaging the inside of said outer wall above said cylindrical outer edge of said rib, said upper lip blocking said product discharge opening when the floating valve is unseated from the valve seat by said actuator and uncovering said product discharge opening when the floating valve is seated on the valve seat by said actuator.

13. A pump according to claim 9, wherein:

said outer wall of the housing has a product discharge opening therein leading from said pumping chamber;

and said floating valve has an upper lip projecting from said annular rib and sealingly engaging the inside of said outer wall above said cylindrical outer edge of said rib, said upper lip blocking said product discharge opening when the floating valve is unseated from the valve seat by said actuator and uncovering said product discharge opening when the floating valve is seated on the valve seat by said actuator.

14. In a pump for dispensing product from a container through a dip tube extending up through the container, said pump comprising a housing for attachment to the upper end of the dip tube, manually operable pumping means for withdrawing product from the container up through said dip tube, discharge valve means controlling the discharge of product from the pump, a discharge spout extending from said discharge valve means and having a horizontal product passageway therein, and manually adjustable valve means on the outer end of said spout operatively arranged selectively to direct a discharge spray of droplets substantially horizontally away from said passageway in the spout or to direct a continuous stream discharge of the product substantially vertically down from said passageway in the spout;

the improvement wherein said valve means on the spout comprises:

an enlargement on the outer end of the spout having a cylindrical periphery, said enlargement having a small opening in its outer end and having a substantially larger bottom opening in its cylindrical periphery, both of said openings communicating with said passageway in the spout;

and a valve member rotatably mounted on said enlargement, said valve member having an end wall extending across and sealingly engaging the outer end of said enlargement and a cylindrical side wall snugly surrounding and sealingly engaging the cylindrical periphery of said enlargement, said valve member having a small opening in its outer end wall which registers with said small opening in the outer end of said enlargement in one rotational position of the valve body, and said valve body having a larger opening in its side wall which registers with said bottom opening in said enlargement in a different rotational position of the valve body.

15. For use with a container having a top opening therein and a dip tube extending up through said top container for passing product therefrom, the combination of:

a manually operable pump having means for connecting it to the upper end of the dip tube for withdrawing product from the container;

a measuring cup attached to the pump and extending below and laterally beyond the pump, and means on the bottom of said measuring cup for attaching it to the container around said top opening therein to support the pump on the container;

said pump having discharge means for passing product pumped from the container down into the measuring cup;

and a support tube extending up from said attaching means and passing the dip tube from the top opening in the container to the bottom of the pump, said support tube having an enlarged rounded bead at the top which has a snap fit in the bottom of the pump to attach the upper end of the support tube to the bottom of the pump.

16. The combination of claim 15, wherein said discharge means comprises a spout extending transversely outward from the pump.

17. The combination of claim 16, wherein said discharge means further comprise a discharge valve on the outer end of said spout.

18. For use with a container having a top opening therein and an externally screw-threaded neck extending around said opening, and a dip tube extending up through the container for passing product therefrom the combination of:

a manually operable pump having means for connecting it to the upper end of the dip tube for withdrawing product from the container;

a measuring cup attached to the pump and extending below and laterally beyond the pump, and means on said measuring cup for attaching it to the container to support the pump on the container;

said pump having discharge means for passing product pumped from the container down into the measuring cup;

said attaching means being a downwarding projecting, internally screw-threaded collar on the bottom of said measuring cup for attaching it to said externally screw-threaded neck on the top of the container;

said measuring cup having a support tube extending up from said collar and having an enlarged rounded bead on its upper end which has a snap fit in the bottom of the pump, said support tube being dimensioned to pass the dip tube up from said container neck to the bottom of the pump;

and said discharge means comprising a spout extending transversely outward from the pump and a discharge valve on the outer end of said spout.

* * * * *